US012763328B2

(12) United States Patent
Wu et al.

(10) Patent No.: US 12,763,328 B2
(45) Date of Patent: Oct. 13, 2026

(54) TERNARY PRECURSOR AND PREPARATION METHOD THEREFOR, TERNARY POSITIVE ELECTRODE MATERIAL, AND ELECTRIC APPARATUS

(71) Applicant: CONTEMPORARY AMPEREX TECHNOLOGY (HONG KONG) LIMITED, Hong Kong (CN)

(72) Inventors: Qi Wu, Ningde (CN); Chongheng Shen, Ningde (CN); Qiang Chen, Ningde (CN); Jingpeng Fan, Ningde (CN); Yuxiang Zhao, Ningde (CN); Qisen Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 597 days.

(21) Appl. No.: 18/322,010

(22) Filed: May 23, 2023

(65) Prior Publication Data

US 2024/0199439 A1 Jun. 20, 2024

Related U.S. Application Data

(63) Continuation of application No. PCT/CN2022/096551, filed on Jun. 1, 2022.

(30) Foreign Application Priority Data

Sep. 18, 2021 (CN) .......................... 202111102796.8

(51) Int. Cl.

*C01G 53/82* (2025.01)
*C01G 53/05* (2025.01)

(Continued)

(52) U.S. Cl.

CPC ............ *H01M 4/525* (2013.01); *C01G 53/05* (2025.01); *C01G 53/84* (2025.01); *H01M 4/505* (2013.01);

(Continued)

(58) Field of Classification Search

CPC ....... C01G 53/82; C01G 53/04; H01M 4/505; H01M 4/525

See application file for complete search history.

(56) References Cited

FOREIGN PATENT DOCUMENTS

| | | | |
|---|---|---|---|
| CN | 104409716 | A | 3/2015 |
| CN | 108123113 | A | 6/2018 |

(Continued)

OTHER PUBLICATIONS

International Search Report for PCT Application No. PCT/CN2022/096551, mailed Aug. 30, 2022.

(Continued)

*Primary Examiner* — James A Fiorito

(74) *Attorney, Agent, or Firm* — Ladas & Parry, LLP

(57) ABSTRACT

This application relates to a ternary precursor for making a material for positive electrodes in lithium batteries. In the ternary precursor, primary particles or whiskers of the ternary precursor are distributed in a radial direction. A deformation stacking fault probability $f_D$ of the ternary precursor is ≤2.5%. This application further relates to a preparation method of the ternary precursor, a ternary positive electrode material, a secondary battery, a battery module, a battery pack, and an electric apparatus.

18 Claims, 5 Drawing Sheets

(51) Int. Cl.

| | |
|---|---|
| ***C01G 53/84*** | (2025.01) |
| ***H01M 4/505*** | (2010.01) |
| ***H01M 4/525*** | (2010.01) |
| *H01M 4/02* | (2006.01) |
| *H01M 10/0525* | (2010.01) |

(52) U.S. Cl.

CPC ...... *C01P 2002/72* (2013.01); *C01P 2004/03* (2013.01); *C01P 2004/50* (2013.01); *C01P 2004/51* (2013.01); *C01P 2004/61* (2013.01); *C01P 2004/84* (2013.01); *C01P 2006/11* (2013.01); *C01P 2006/12* (2013.01); *C01P 2006/40* (2013.01); *H01M 2004/021* (2013.01); *H01M 2004/028* (2013.01); *H01M 10/0525* (2013.01)

(56) References Cited

FOREIGN PATENT DOCUMENTS

| | | | |
|---|---|---|---|
| CN | 108793268 | A | 11/2018 |
| CN | 108878818 | A | 11/2018 |
| CN | 110002515 | A | 7/2019 |
| CN | 110422889 | A | 11/2019 |
| CN | 111770896 | A | 10/2020 |
| CN | 111908521 | A | 11/2020 |
| CN | 112151790 | A | 12/2020 |
| CN | 112421014 | A | 2/2021 |
| CN | 112624213 | A | 4/2021 |
| CN | 112670473 | A | 4/2021 |
| CN | 113329975 | A | 8/2021 |
| DE | 102017215146 | A1 | 2/2019 |
| EP | 3757065 | A1 | 12/2020 |
| JP | H10310433 | A | 11/1998 |

OTHER PUBLICATIONS

Written Opinion of International Search Authority for PCT Application No. PCT/CN2022/096551, mailed Aug. 30, 2022.

Extended European Search Report for EP application No. 22868735.5, dated Aug. 12, 2024.

Mock et al., "Atomistic understanding of the LiNiO2—NiO2 phase diagram from experimentally guided lattice models", Journal of Materials Chemistry A, vol. 9, No. 26, Jan. 1, 2021, pp. 14928-14940.

Ramesh Shunmugasundaram et al., "A Study of Stacking Faults and Superlattice Ordering in Some Li-Rich Layered Transition Metal Oxide Positive Electrode Materials", Journal of The Electrochemical Society, vol. 163, No. 7, pp. A1394-A1400 (Jan. 1, 2016).

Tessier et al. "The Structure of Ni(OH)2: From the Ideal Material to the Electrochemically Active One", Journal of The Electrochemical Society, 146 (6) 2059-2067 (Dec. 31, 1999).

Bernard M. et al., Structural defects and electrochemical reactivity of b-Ni(OH)2, J. Power Sources, vol. 63, Dec. 31, 1996.

First Office Action of CN application No. 202111102796.8, mailed May 26, 2023.

TERNARY PRECURSOR AND PREPARATION METHOD THEREFOR, TERNARY POSITIVE ELECTRODE MATERIAL, AND ELECTRIC APPARATUS

CROSS REFERENCE TO RELATED APPLICATIONS

This application is a continuation of International Patent Application No. PCT/CN2022/096551, filed on Jun. 1, 2022, which claims priority to Chinese Patent Application No. 202111102796.8, filed on Sep. 18, 2021. The aforementioned patent applications are incorporated by reference in their entirety.

TECHNICAL FIELD

This application relates to the field of lithium battery technologies, and in particular, to a ternary precursor and a preparation method therefor, a ternary positive electrode material, a secondary battery, a battery module, a battery pack, and an electric apparatus.

BACKGROUND

With the rapid development of the new energy field, lithium-ion secondary batteries, by virtue of their excellent electrochemical performance, zero memory effect, and little environmental pollution, are widely used in all kinds of large power apparatuses, energy storage systems, and consumer products, especially the field of new energy vehicles such as battery electric vehicles and hybrid electric vehicles.

In addition, consumers also put forward higher requirements on lithium-ion secondary batteries, for example, increasingly high requirements for energy density of lithium-ion secondary batteries. High-nickel positive electrode active materials are considered as the optimal choice to meet the requirements for high energy density. However, with the constant increase in nickel content, high-nickel positive electrode active materials have decreasing structural stability, thus affecting the cycling performance and storage performance of lithium-ion secondary batteries.

Therefore, how the capacity of lithium-ion secondary batteries is increased while maintaining the cycling performance and storage performance of the batteries without worsening has become a technical problem that needs to be resolved urgently.

SUMMARY

In view of the technical problem in the background, this application provides a ternary precursor so that lithium-ion secondary batteries prepared with such ternary precursor have improved cycling performance and storage performance while having a high capacity.

To achieve the foregoing objective, a first aspect of this application provides a ternary precursor. Primary particles or whiskers of the ternary precursor are distributed in a radial direction; and a deformation stacking fault probability $f_D$ of the ternary precursor is ≤2.5%, and the deformation stacking fault probability $f_D$ is calculated as follows:

$$f_D=0.1552\times B(101)-0.03233\times B(102)-0.4399/D(001),$$

where B(101) is a full width at half maximum in an X-ray diffraction pattern of a (101) crystal plane of the ternary precursor, B(102) is a full width at half maximum in an X-ray diffraction pattern of a (102) crystal plane of the ternary precursor, and D(001) is a full width at half maximum in an X-ray diffraction pattern of a (001) crystal plane of the ternary precursor, where the full widths at half maximum are measured in degrees.

Compared with the prior art, this application includes at least the following beneficial effects:

The primary particles or whiskers of the ternary precursor in this application are distributed in the radial direction such that a ternary positive electrode material prepared with such ternary precursor has good lithium ion transport channels. In addition, with the deformation stacking fault probability of the ternary precursor controlled at 2.5% or below, the ternary positive electrode material prepared with such ternary precursor has good structural stability, thereby improving the cycling performance and storage performance of lithium-ion secondary batteries.

In any embodiment, the ternary precursor includes an inner core and a shell enclosing the inner core, a radius R of the inner core is 0.1-6.0 μm, and a thickness h of the shell is 2-10 μm. The radius of the inner core and the thickness of the shell being controlled within the given ranges can further improve the capacity and storage performance of secondary batteries.

In any embodiment, a molecular formula of the inner core is $[Ni_xCo_yMn_{(1-x-y)}](OH)_2$, where 0.8≤x<1.0, 0<y<0.2, and x+y<1; a molecular formula of the shell is $[Ni_aCo_bMn_{(1-a-b)}](OH)_2$, where 0.8≤a<1.0, 0<b<0.2, and a+b<1; and Ni contents in the inner core and the shell make the following relationship hold: a≤x. The Ni content in the inner core of the ternary precursor being made higher than or equal to the Ni content in the shell can further improve the cycling performance and storage performance of secondary batteries while ensuring a high capacity of secondary batteries.

In any embodiment, a volume distribution span of particles of the ternary precursor is $(D_v90-D_v10)/D_v50\geq1.3$. The ternary precursor of this application has a wide particle size distribution and therefore can improve the volumetric energy density of the ternary positive electrode material.

In any embodiment, a volume-based median particle size $D_v50$ of particles of the ternary precursor is 5-15 μm, and optionally 5-10 μm. The volume-based median particle size of the ternary precursor falling within the given range can further increase the capacity of the ternary positive electrode material prepared with such ternary precursor.

In any embodiment, a specific surface area BET of particles of the ternary precursor is 5-20 $m^2/g$, and optionally 7-15 $m^2/g$. The BET of the ternary precursor falling within the given range helps to improve the capacity and long-term cycling performance of the ternary positive electrode material.

In any embodiment, a tap density of particles of the ternary precursor is TD≥1.9 $g/cm^3$. A higher TD of the ternary precursor means a higher tap density of a sintered ternary positive electrode material, and hence a higher compacted density and energy density of the ternary positive electrode material.

In any embodiment, a cracking rate of particles of the ternary precursor is ≤20% at a pressure of 5 tons, where an expression of the cracking rate is $\alpha=[D_v1$ (before compression)$-D_v1$ (after compression)$]/D_v1$ (before compression), where $D_v1$ (before compression) is a particle size at which cumulative distribution by volume of the ternary precursor before compression reaches 1% as counted from the small particle size side, measured in μm, and $D_v1$ (after compression) is a particle size at which cumulative distribution by volume of the ternary precursor after compression reaches 1% as counted from the small particle size side, measured in μm. When the cracking rate of the ternary precursor falls within the given range at a pressure of 5 tons, the particles of the ternary precursor have a higher pressure-resistant strength and higher structural stability.

In any embodiment, the ternary precursor is doped with element M, where element M is one or more of Zr, W, Al, Sr, Ti, Ca, Sb, Mg, Zn, Te, and Fe. Uniformly doping the element into the ternary precursor can improve the cycling stability of the ternary positive electrode material prepared with such ternary precursor.

A second aspect of this application provides a preparation method of ternary precursor. The preparation method includes the following steps:

S1. providing a first mixed nickel-cobalt-manganese metal salt solution and a second mixed nickel-cobalt-manganese metal salt solution;

S2. adding a first base solution having a first pH value and a first ammonia concentration to a first reactor, and adding the first mixed nickel-cobalt-manganese metal salt solution, an alkali solution, and ammonia to the first reactor to maintain the pH value and the ammonia concentration unchanged, so as to form a seed crystal slurry of ternary precursor; and S3. adding water as a base solution to a second reactor, adding the seed crystal slurry of ternary precursor to adjust the base solution to a second pH value and a second ammonia concentration, and adding the second mixed nickel-cobalt-manganese metal salt solution, an alkali solution, ammonia, and the seed crystal slurry of ternary precursor to the second reactor to maintain the pH value and the ammonia concentration unchanged, so as to form a ternary precursor; where primary particles or whiskers of the ternary precursor are distributed in a radial direction; and a deformation stacking fault probability $f_D$ of the ternary precursor is ≤2.5%, and the deformation stacking fault probability $f_D$ is calculated as follows:

$$f_D = 0.1552 \times B(101) - 0.03233 \times B(102) - 0.4399 / D(001),$$

where B(101) is a full width at half maximum in an X-ray diffraction pattern of a (101) crystal plane of the ternary precursor, B(102) is a full width at half maximum in an X-ray diffraction pattern of a (102) crystal plane of the ternary precursor, and D(001) is a full width at half maximum in an X-ray diffraction pattern of a (001) crystal plane of the ternary precursor, where the full widths at half maximum are measured in degrees.

With the method of this application, a ternary precursor having a good inner core-shell structure can be obtained, and the difference of principal components of the shell and inner core can be controlled, thereby not only ensuring the high capacity of lithium-ion secondary batteries, but also improving the cycling performance and storage performance of lithium-ion secondary batteries.

In any embodiment, in step S1, a molar ratio of nickel, cobalt, and manganese in the first mixed nickel-cobalt-manganese metal salt solution is x:y:(1−x−y), where 0.8≤x<1.0, 0<y<0.2, and x+y<1; and a molar ratio of nickel, cobalt, and manganese in the second mixed nickel-cobalt-manganese metal salt solution is a:b:(1−a−b), where 0.8≤a<1.0, 0<b<0.2, a+b<1, and a≤x.

In any embodiment, in step S2, the first pH value is 11.5-12.5, and optionally 11.8-12.2; and the first ammonia concentration is 0.2-0.6 mol/L, and optionally 0.3-0.5 mol/L.

In any embodiment, in step S3, the second pH value is 11.0-12.0, and optionally 11.1-11.7; and the second ammonia concentration is 0.2-0.6 mol/L, and optionally 0.3-0.5 mol/L.

In any embodiment, in step S3, a solid-liquid ratio of the seed crystal slurry of ternary precursor in the second reactor is 0.1-0.2.

In any embodiment, a volume-based median particle size $D_v50$ of the seed crystal slurry of ternary precursor is 1-5 μm; and a volume-based median particle size $D_v50$ of the ternary precursor is 5-15 μm, and optionally 5-10 μm.

A third aspect of this application provides a ternary positive electrode material prepared with the ternary precursor of the first aspect of this application.

In any embodiment, the ternary positive electrode material includes secondary particles formed by aggregation of a plurality of primary particles, where the plurality of primary particles are arranged in a radial direction of the secondary particles.

In any embodiment, a volume-based median particle size $D_v50$ of the ternary positive electrode material is 5-15 μm, and optionally 5-10 μm.

A fourth aspect of this application provides a secondary battery including the ternary positive electrode material in the third aspect of this application.

A fifth aspect of this application provides a battery module including the secondary battery in the fourth aspect of this application.

A sixth aspect of this application provides a battery pack including the battery module in the second aspect of this application.

A seventh aspect of this application provides an electric apparatus including at least one of the secondary battery in the fourth aspect of this application, the battery module in the fifth aspect of this application, or the battery pack in the sixth aspect of this application.

The battery module, the battery pack, and the electric apparatus in this application include the secondary battery in this application, and therefore have at least the same advantages as the secondary battery.

DESCRIPTION OF REFERENCE SIGNS

Figure 1:
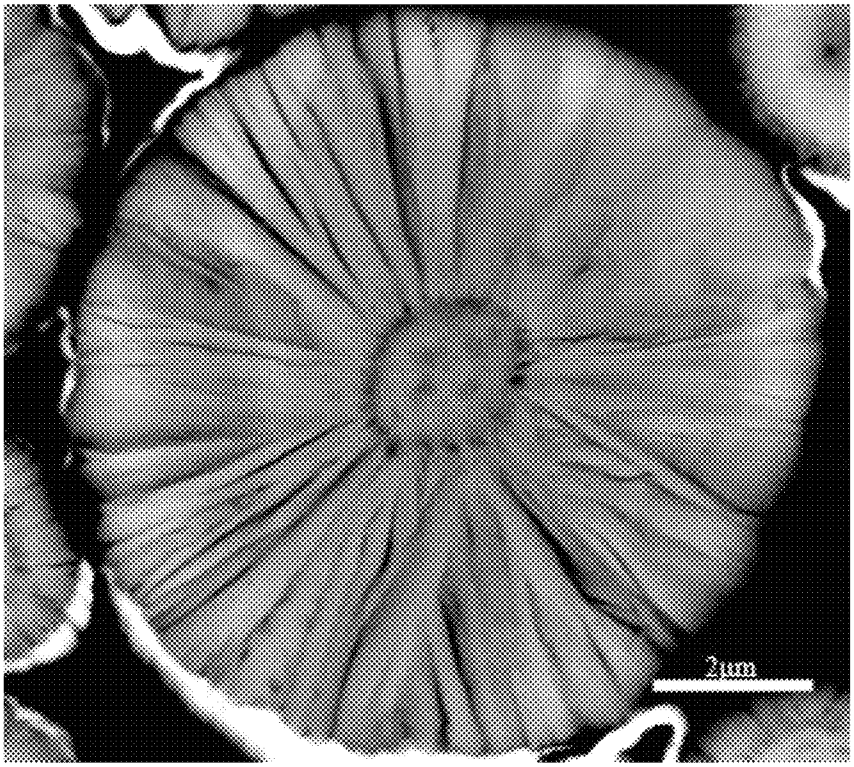
FIG. 1 is an SEM diagram of a section of a ternary precursor prepared in Example 1 of the present application.

1. battery pack;
2. upper box body;
3. lower box body;
4. battery module;
5. secondary battery;
51. housing;
52. electrode assembly; and
53. top cover assembly.

DETAILED DESCRIPTION

The following specifically discloses embodiments of the ternary precursor and preparation method therefor, ternary positive electrode material, secondary battery, battery module, battery pack, and electric apparatus of this application with appropriate reference to the accompanying drawings. However, there may be cases where unnecessary detailed descriptions are omitted. For example, detailed descriptions of a well-known matter and repeated descriptions of actually identical structures have been omitted. This is to avoid unnecessarily prolonging the following descriptions, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that special range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are provided herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions Unless otherwise specified, all the steps in this application can be performed in the order described or in random order, preferably, in the order described. For example, a method including steps (a) and (b) indicates that the method may include steps (a) and (b) performed in sequence, or may include steps (b) and (a) performed in sequence. For example, that the method may further include step (c) indicates that step (c) may be added to the method in any order. For example, the method may include steps (a), (b), and (c), or steps (a), (c), and (b), or steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

[Ternary Precursor]

In an embodiment of this application, this application provides a ternary precursor. Primary particles or whiskers of the ternary precursor are distributed in a radial direction; and a deformation stacking fault probability $f_D$ of the ternary precursor is ≤2.5%, and the deformation stacking fault probability $f_D$ is calculated as follows:

$$f_D=0.1552\times B(101)-0.03233\times B(102)-0.4399/D(001),$$

where B(101) is a full width at half maximum in an X-ray diffraction pattern of a (101) crystal plane of the ternary precursor, B(102) is a full width at half maximum in an X-ray diffraction pattern of a (102) crystal plane of the ternary precursor, and D(001) is a full width at half maximum in an X-ray diffraction pattern of a (001) crystal plane of the ternary precursor, where the full widths at half maximum are measured in degrees.

Although the mechanism is not clear, the applicant has accidentally found that in this application, when the primary particles or whiskers of the ternary precursor are distributed in the radial direction, as shown in FIG. 1, the ternary positive electrode material prepared with such ternary precursor can have good lithium-ion transport channels, facilitating lithium ion transport during charge and discharge, thereby improving the long-term cycling performance of the ternary positive electrode material. In addition, the ternary precursor of this application has a low deformation stacking fault probability, and therefore the ternary positive electrode material prepared with such ternary precursor has good structural stability, thereby increasing the capacity of secondary batteries and improving the cycling performance and storage performance of secondary batteries.

In this application, the full widths at half maximum in the X-ray diffraction pattern of the (101) crystal plane, (102) crystal plane, or (001) crystal plane of the ternary precursor can be measured in a method well known in the art. For example, a Bruker D8DISCOER X-ray diffractometer may be used to perform a slow (1°/min) scan on the ternary precursor at a 2θ angle of 10-70°, and spectral fitting is performed to obtain diffraction peak related parameters of the (001) crystal plane, (101) crystal plane, or (102) crystal plane.

In some embodiments, the ternary precursor includes an inner core and a shell enclosing the inner core, a radius R of the inner core is 0.1-6.0 μm, and a thickness h of the shell is 2-10 μm. The radius of the inner core and the thickness of the shell being controlled within the given ranges can further improve the capacity and storage performance of secondary batteries.

In this application, the inner core radius and shell thickness of the particles of the ternary precursor may be measured in a method well known in the art. For example, cross-sectional screenshots of the ternary precursor may be measured using a Zeiss SIGMA 300 scanning electron microscope SEM. To ensure the accuracy of the test values, a plurality (for example, 20) of cross-sections of the particles of the ternary precursor may be taken to measure respective inner core radii and shell thicknesses so as to obtain an average value.

In some embodiments, a molecular formula of the inner core is $[Ni_xCo_yMn_{(1-x-y)}](OH)_2$, where $0.8 \le x < 1.0$, $0 < y < 0.2$, and $x+y<1$;

a molecular formula of the shell is $[Ni_aCo_bMn_{(1-a-b)}](OH)_2$, where $0.8 \le a < 1.0$, $0 < b < 0.2$, and $a+b<1$; and Ni contents in the inner core and the shell make the following relationship hold: $a \le x$.

The Ni content in the inner core of the ternary precursor being made higher than or equal to the Ni content in the shell means a decreased Ni content in the ternary precursor while maintaining a high Ni content in the particles of the ternary precursor. This can reduce side reactions between the surface of the ternary positive electrode material prepared with such ternary precursor and electrolyte while maintaining a high capacity of secondary batteries, thereby further improving the cycling performance and storage performance of secondary batteries.

In some embodiments, a volume distribution span of particles of the ternary precursor is $(D_v90-D_v10)/D_v50 \ge 1.3$. The ternary precursor of this application has a wide particle size distribution and therefore helps to increase the compacted density of the ternary positive electrode prepared with such ternary precursor, thereby further increasing the volumetric energy density of the ternary positive electrode material.

In some embodiments, a volume-based median particle size $D_v50$ of particles of the ternary precursor is 5-15 μm, and optionally 5-10 μm. The volume-based median particle size of the ternary precursor falling within the given range can further increase the capacity of the ternary positive electrode material prepared with such ternary precursor.

In this application, the volume-based particle sizes D10, $D_v50$, $D_v90$ of the particles of the ternary precursor are concepts well known in the art. Specifically, D10 is a particle size at which cumulative distribution by volume of power particles reaches 10% as counted from the small particle size side, generally measured in μm. $D_v50$ is a particle size at which cumulative distribution by volume of power particles reaches 50% as counted from the small particle size side, generally measured in μm. $D_v90$ is a particle size at which cumulative distribution by volume of power particles reaches 90% as counted from the small particle size side, generally measured in μm. The volume-based particle sizes $D_v10$, $D_v50$, $D_v90$ of the particles of the ternary precursor may be tested by using a method well known in the art. For example, the particle sizes may be determined using a Malvern 2000 instrument in accordance with the Chinese National Standard GB/T 19077-2016/ISO 13320:2009 "Particle size distribution laser diffraction method".

In some embodiments, a specific surface area BET of particles of the ternary precursor is 5-20 $m^2/g$, and optionally 7-15 $m^2/g$. The BET of the ternary precursor falling within the given range helps to obtain sintered primary particles with high crystallinity, thereby helping to improve the capacity and long-term cycling performance of the ternary positive electrode material.

In this application, the specific surface area BET of the particles of the ternary precursor may be tested by using a method well known in the art. For example, the specific surface area may be determined using a TriStar II 3020 instrument in accordance with the Chinese National Standard GB/T 19587-2017 "Determination of specific surface area of solid substances by gas adsorption BET method".

In some embodiments, a tap density TD of particles of the ternary precursor is $\ge 1.9$ $g/cm^3$. A higher TD of the ternary precursor means a higher tap density of a sintered ternary positive electrode material, and hence a higher compacted density and energy density of the ternary positive electrode material.

In this application, the tap density TD of the particles of the ternary precursor may be tested by using a method well known in the art. For example, the tap density may be determined using a Bettersize BT-300 powder tap density tester in accordance with the Chinese National Standard GB/T 5162-2006 "Metallic powders-determination of tap density".

In some embodiments, a cracking rate of particles of the ternary precursor is ≤20% at a pressure of 5 tons, where an expression of the cracking rate is $\alpha=[D_v1$ (before compression)$-D_v1$ (after compression)$]/D_v1$ (before compression), where $D_v1$ (before compression) is a particle size at which cumulative distribution by volume of the ternary precursor before compression reaches 1% as counted from the small particle size side, measured in μm, and $D_v1$ (after compression) is a particle size at which cumulative distribution by volume of the ternary precursor after compression reaches 1% as counted from the small particle size side, measured in μm. When the cracking rate of the ternary precursor falls within the given range at a pressure of 5 tons, the particles of the ternary precursor have a higher pressure-resistant strength and higher structural stability.

In this application, the cracking rate of the particles of the ternary precursor may be tested by using a method well known in the art. For example, the cracking rate may be determined using the steps in the following test method: first, a pressure environment is created using external force following the compacted density test method, and original powder and compacted powder are placed in separate bags for storage; and second, the two bags of powder are placed in a laser particle size analyzer for test, with an input parameter set to $D_v1$, and data are substituted into a cracking rate formula to find a corresponding numerical value. The compacted density test method includes: compacting the sample in a specific mold with a pressure of 5 tons to obtain a thickness of the sample, and computing the compacted density according to $\rho_c=m/V=m/(S*H)$, where m is a material weight, S is a powder area, and H is a powder height.

In some embodiments, the ternary precursor is doped with element M, where element M is one or more of Zr, W, Al, Sr, Ti, Ca, Sb, Mg, Zn, Te, and Fe. Uniformly doping the element into the ternary precursor helps to improve the structural stability, thereby further improving the cycling stability of the ternary positive electrode material prepared with such ternary precursor.

An embodiment of this application provides a preparation method of ternary precursor. The preparation method includes the following steps:

S1. providing a first mixed nickel-cobalt-manganese metal salt solution and a second mixed nickel-cobalt-manganese metal salt solution;

S2. adding a first base solution having a first pH value and a first ammonia concentration to a first reactor, and adding the first mixed nickel-cobalt-manganese metal salt solution, an alkali solution, and ammonia to the first reactor to maintain the pH value and the ammonia concentration unchanged, so as to form a seed crystal slurry of ternary precursor; and S3. adding water as a base solution to a second reactor, adding the seed crystal slurry of ternary precursor to adjust the base solution to a second pH value and a second ammonia concentration, and adding the second mixed nickel-cobalt-manganese metal salt solution, an alkali solution, ammonia, and the seed crystal slurry of ternary precursor to the second reactor to maintain the pH value and the ammonia concentration unchanged, so as to form a ternary precursor; where primary particles or whiskers of the ternary precursor are distributed in a radial direction; and a deformation stacking fault probability $f_D$ of the ternary precursor is ≤2.5%, and the deformation stacking fault probability $f_D$ is calculated as follows:

$$f_D=0.1552\times B(101)-0.03233\times B(102)-0.4399/D(001),$$

where B(101) is a full width at half maximum in an X-ray diffraction pattern of a (101) crystal plane of the ternary precursor, B(102) is a full width at half maximum in an X-ray diffraction pattern of a (102) crystal plane of the ternary precursor, and D(001) is a full width at half maximum in an X-ray diffraction pattern of a (001) crystal plane of the ternary precursor, where the full widths at half maximum are measured in degrees.

In the preparation method of this application, both nucleation and nucleus growth are present only in seed crystal synthesis of step S2, and only nucleus growth is present in step S3. The seed crystals required for continuous production come from the continuous addition of the seed crystal slurry synthesized in step S2, which helps to control the process stability during the continuous production in step S3, and can generate a shell layer structure on the inner core in the radial distribution. In addition, the deformation stacking fault probability of the ternary precursor being controlled to be not greater than 2.5% can help to improve the structural stability of the ternary positive electrode material prepared with such ternary precursor.

With the preparation method of this application, a ternary precursor having an inner core-shell structure can be obtained, and the difference of principal components of the shell and inner core can be controlled, thereby further improving the structural stability and extractable capacity of the ternary material prepared with such ternary precursor.

In some embodiments, in step S1, a molar ratio of nickel, cobalt, and manganese in the first mixed nickel-cobalt-manganese metal salt solution is x:y:(1−x−y), where 0.8≤x<1.0, 0<y<0.2, and x+y<1; and a molar ratio of nickel, cobalt, and manganese in the second mixed nickel-cobalt-manganese metal salt solution is a:b:(1−a−b), where 0.8≤a<1.0, 0<b<0.2, a+b<1, and a≤x.

In some embodiments, in step S1, the first and second mixed nickel-cobalt-manganese metal salt solutions are prepared from a nickel salt, a cobalt salt, a manganese salt, and pure water. For example, the nickel salt may be one of nickel nitrate, nickel acetate, and nickel sulfate. The cobalt salt may be one of cobalt nitrate, cobalt acetate, and cobalt sulfate. The manganese salt may be one of manganese nitrate, manganese acetate, and manganese sulfate.

In some embodiments, in step S1, the concentration of the first and second mixed nickel-cobalt-manganese metal salt solutions are 0.5-2.5 mol/L.

In some embodiments, in step S2, the first pH value is 11.5-12.5, and optionally 11.8-12.2; and the first ammonia concentration is 0.2-0.6 mol/L, and optionally 0.3-0.5 mol/L. With the process conditions of step S2 controlled, seeds crystal having a volume-based median particle size $D_v50$ of 0.1-5 μm can be stably synthesized.

In some embodiments, in step S2, a stirring linear velocity is 5.0-7.0 m/s.

In some embodiments, in step S3, the second pH value is 11.0-12.0, and optionally 11.1-11.7; and the second ammonia concentration is 0.2-0.6 mol/L, and optionally 0.3-0.5 mol/L. With the process conditions of step S3 controlled, a radially distributed shell layer can be stably generated on the seed crystal, and ternary precursors having a volume-based median particle size $D_v50$ of 5-15 μm can be continuously and stably generated.

In some embodiments, in step S3, a solid-liquid ratio of the seed crystal slurry of ternary precursor in the second reactor is 0.1-0.2.

In some embodiments, in step S3, the stirring linear velocity is 3.0-6.0 m/s.

In some embodiments, in steps S2 and S3, the temperature is 40-75° C.

In some embodiments, in steps S2 and S3, the alkali solution is a sodium hydroxide solution with a concentration of 1-10 mol/L.

In some embodiments, in steps S2 and S3, a concentration of the ammonia is 2-14 mol/L.

In some embodiments, a volume-based median particle size $D_v50$ of the seed crystal slurry of ternary precursor is 1-5 μm; and a volume-based median particle size $D_v50$ of the ternary precursor is 5-15 μm, and optionally 5-10 μm.

In some embodiments, in step S1, the first and/or second mixed nickel-cobalt-manganese metal salt solution may further contain 0.01-2% of element M based on a total mole number of nickel, cobalt, and manganese. Element M may be one or more of Zr, W, Al, Sr, Ti, Ca, Sb, Mg, Zn, Te, and Fe.

[Ternary Positive Electrode Material]

An embodiment of this application provides a ternary positive electrode material prepared with the ternary precursor of the first aspect of this application.

Figure 2:
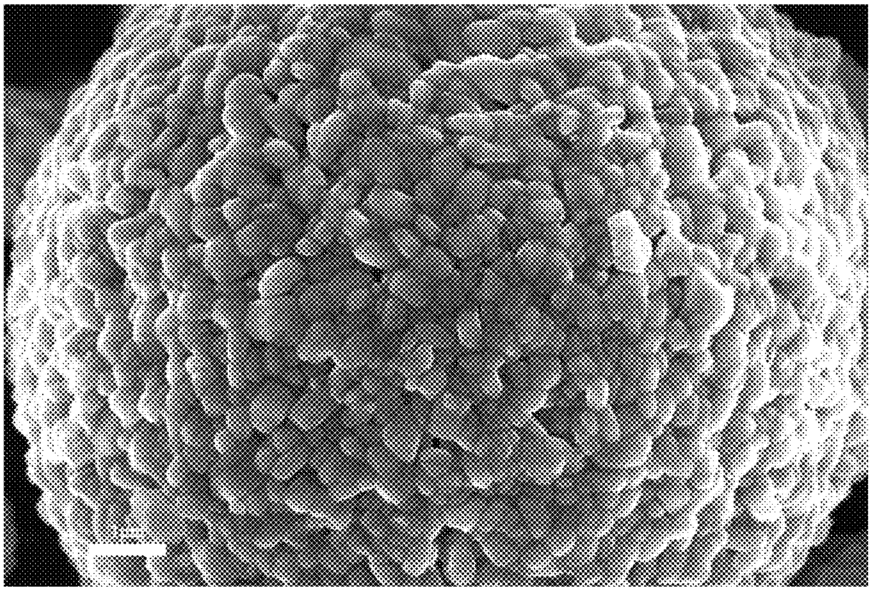
FIG. 2 is an SEM diagram of a ternary positive electrode material prepared in Example 1 of the present application.
Figure 3:
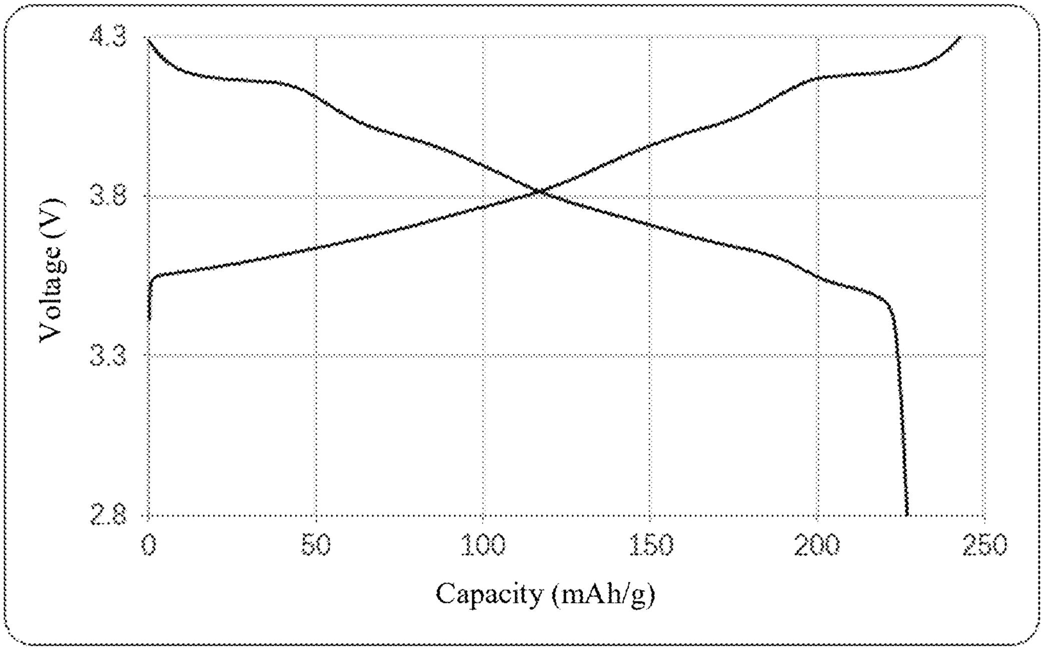
FIG. 3 shows a first-cycle charge-discharge curve of a button cell made from a ternary positive electrode material prepared in Example 1 of the present application.
Figure 4:
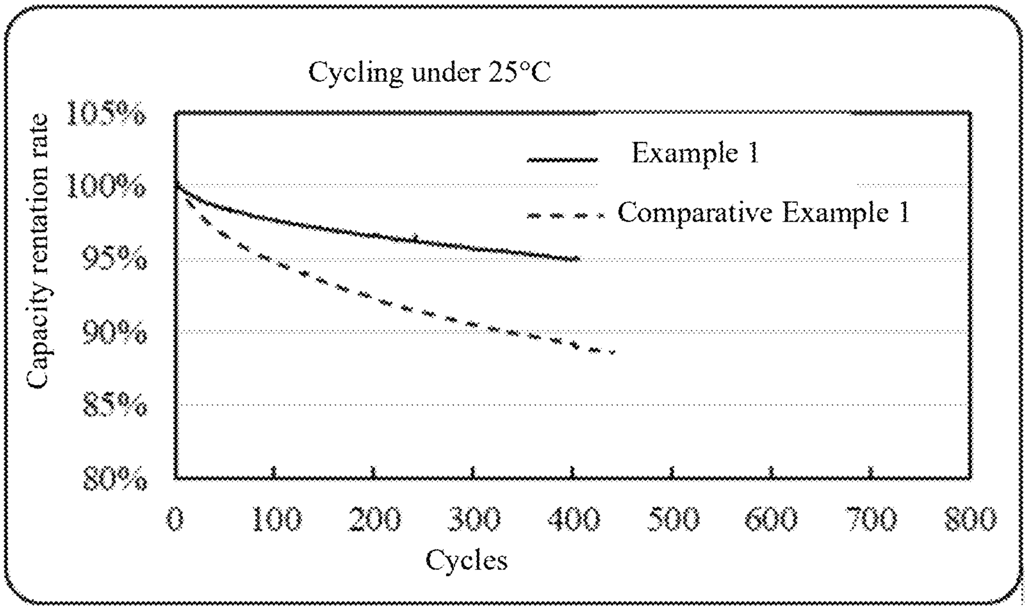
FIG. 4 shows 25° C. cycling comparison curves of full cells made of ternary positive electrode materials prepared in Comparative Example 1 and Example 1.
Figure 5:
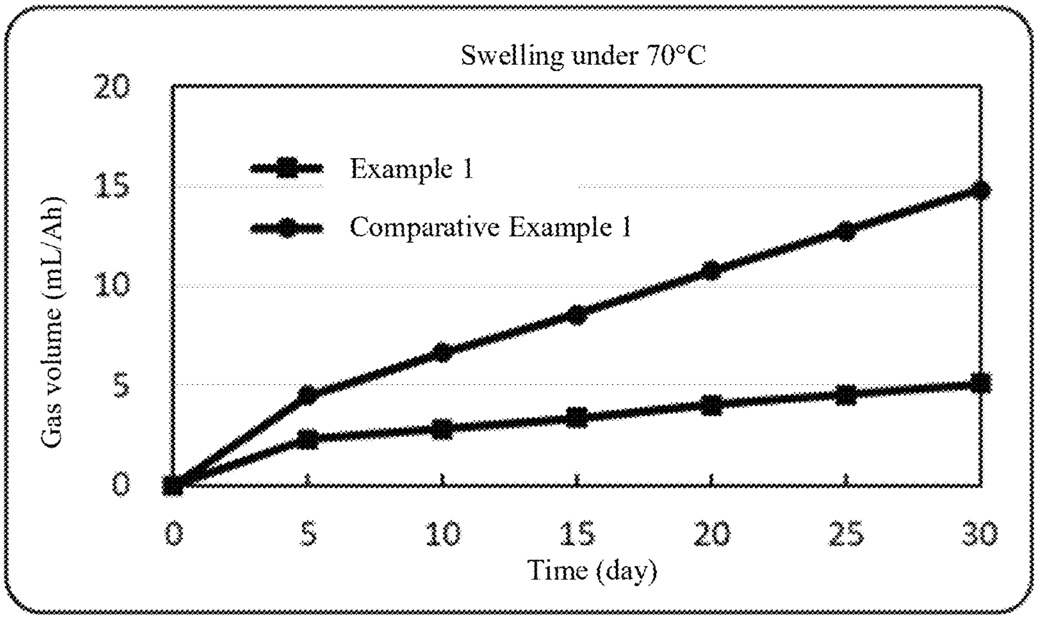
FIG. 5 shows 70° C. swelling comparison curves after storage of full cells made of ternary positive electrode materials prepared in Comparative Example 1 and Example 1.

In some embodiments, the ternary positive electrode material includes secondary particles formed by aggregation of a plurality of primary particles, where the plurality of primary particles are arranged in a radial direction of the secondary particles, as shown in FIG. 2. Radial distribution of the ternary positive electrode material facilitates lithium ion transport during charge and discharge, thereby improving the cycling performance of secondary batteries.

In some embodiments, a volume-based median particle size $D_v50$ of the ternary positive electrode material is 5-15 μm, and optionally 5-10 μm. The volume-based median particle size $D_v50$ falling within the given range can further improve the electrochemical performance of the ternary positive electrode material.

In some embodiments, the molecular composition of the ternary positive electrode material is $Li_zNi_cCo_dMn_{(1-c-d)}O_e$, where 0.95≤z≤1.05, 0.8≤c<1.0, 0<d<0.2, c+d<1, and 1.8≤e≤2.2.

In some embodiments, the ternary positive electrode material is doped with element M1. Element M1 is one or more of Fe, Cr, Ti, Zn, Sr, V, Al, Zr, Ce, Mg, F, Sb, N, and B, and the doping amount of element M1 is 100-5000 ppm by weight of the ternary positive electrode material.

In some embodiments, the particle surface of the ternary positive electrode material has a coating layer containing element M2, the element M2 being one or more of Ti, Al, B, Co, Mg, P, Sr, and V, and a coating amount of the element M2 is 100-20000 ppm by weight of the ternary positive electrode material, optionally 1000-13000 ppm.

In this application, the ternary positive electrode material being doped with the element can significantly improve the structural stability of the ternary positive electrode material. The ternary positive electrode material being coated with the element can significantly reduce interface side reactions, thereby further improving the cycling performance of secondary batteries.

In some embodiments, the preparation method of ternary positive electrode material includes:

(1) placing the ternary precursor of the first aspect of this application, a lithium-containing compound, and an M1-containing compound into a mixer for mixing, and then placing a resulting mixture in an atmosphere furnace for primary sintering to obtain a primary sintered material of the ternary positive electrode material doped with element M1; and (2) placing the primary sintered material and an M2-containing compound into the mixer for mixing, and then placing a resulting mixture in the atmosphere furnace for secondary sintering to form a coating layer of the ternary positive electrode material.

In some embodiments, a water washing step may be selectively performed between steps (1) and (2). The water washing step includes placing the primary sintered material obtained in step (1) into a washing liquid for washing, followed by centrifugation and vacuum drying. The washing liquid may be pure water, ethanol, or a mixture thereof, a solid-liquid ratio of the washing liquid is 1:(0.5-2), a washing time is 0.5-10 min, and a washing temperature is 25-50° C.

The lithium-containing compound is not limited to any particular type in the embodiments of this application, and may be selected based on actual needs. For example, the lithium-containing compound may be lithium hydroxide, lithium carbonate, or lithium nitrate.

The M1-containing compound or the M2-containing compound is not limited to any particular type in the embodiments of this application, and may be selected based on actual needs. For example, the M1-containing compound may be selected from oxide of M1, chloride of M1, sulfate of M1, nitrate of M1, carbonate of M1, or bicarbonate of M1. The M2-containing compound may be selected from oxide of M2, chloride of M2, sulfate of M2, nitrate of M2, carbonate of M2, or bicarbonate of M2.

In some embodiments, in step (1), a ratio of a mole number of lithium in the lithium-containing compound to a sum of mole numbers of nickel, cobalt, and manganese in the ternary precursor is 1:(1.0-1.2).

In some embodiments, in steps (1) and (2), a sintering atmosphere in the atmosphere furnace may be air or oxygen, and optionally oxygen. An oxygen concentration in the atmosphere furnace is 50-100%. Further optionally, the oxygen concentration in the atmosphere furnace is 80-100%.

In some embodiments, in step (1), a temperature for primary sintering is 700-950° C. Such temperature in primary sintering is maintained for 5-25 h, and optionally for 10-20 h.

In some embodiments, in step (2), a temperature for secondary sintering is 200-700° C., and optionally 300-700° C. Such temperature in secondary sintering is maintained for 5-15 h, and optionally for 5-10 h.

In addition, the following describes a secondary battery, a battery module, a battery pack, and an electric apparatus in this application with appropriate reference to the accompanying drawings.

An embodiment of this application provides a secondary battery.

Normally, the secondary battery includes a positive electrode plate, a negative electrode plate, an electrolyte, and a separator. In a charge and discharge process of the battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate to mainly prevent a short circuit between positive and negative electrodes and to allow the ions to pass through.

[Positive Electrode Plate]

The positive electrode plate includes a positive electrode current collector and a positive electrode film layer disposed on at least one surface of the positive electrode current collector, and the positive electrode film layer includes the ternary positive electrode material in the third aspect of this application.

For example, the positive electrode current collector includes two opposite surfaces in its thickness direction, and the positive electrode film layer is disposed on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the positive electrode film layer may further optionally include a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer further optionally includes a conductive agent. For example, the conductive agent may be selected from more than one of superconducting carbon, acetylene black, carbon black, Ketjen black, carbon dots, carbon nanotubes, graphene, and carbon nanofiber.

In some embodiments, the positive electrode plate may be prepared by using the following manners: the compositions used for preparing the positive electrode plate, for example, the ternary positive electrode material, the conductive agent, the binder, and any other compositions, are dispersed in a solvent (for example, N-methylpyrrolidone) to form a positive electrode slurry. The positive electrode slurry is applied onto the positive electrode current collector, and processes such as drying and cold pressing are performed to obtain the positive electrode plate.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, for the metal foil, a copper foil may be used. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, or silver alloy) on the polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a well-known negative electrode active material used for a battery in the art. For example, the negative electrode active material may include at least one of the following materials: artificial graphite, natural graphite, soft carbon, hard carbon, silicon-based material, tin-based material, and lithium titanate. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, but may use other conventional materials that can be used as negative electrode active materials for batteries instead. One type of these negative electrode active materials may be used alone, or two or more types may be used in combination.

In some embodiments, the negative electrode film layer may further optionally include a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofiber.

In some embodiments, the negative electrode film layer may further optionally include other promoters such as a thickener (for example, sodium carboxymethyl cellulose (CMC-Na)).

In some embodiments, the negative electrode plate may be prepared in the following manner: the compositions used for preparing the negative electrode plate, for example, the negative electrode active material, the conductive agent, the binder, and any other compositions, are dispersed in a solvent (for example, deionized water) to form a negative electrode slurry; and the negative electrode slurry is applied onto the negative electrode current collector, followed by processes such as drying and cold pressing to obtain the negative electrode plate.

[Electrolyte]

The electrolyte conducts ions between the positive electrode plate and the negative electrode plate. The electrolyte is not specifically limited to any particular type in this application, and may be selected based on needs. For example, the electrolyte may be in a liquid state, a gel state, or an all-solid state.

In some embodiments, the electrolyte is a liquid electrolyte. The liquid electrolyte includes an electrolytic salt and a solvent.

In some embodiments, the electrolytic salt may be selected from at least one of lithium hexafluorophosphate, lithium tetrafluoroborate, lithium perchlorate, lithium hexafluoroborate, lithium bis(fluorosulfonyl)imide, lithium bis-trifluoromethanesulfon imide, lithium trifluoromethanesulfonate, lithium difluorophosphate, lithium difluorooxalatoborate, lithium bisoxalatoborate, lithium difluorobisoxalate phosphate, and lithium tetrafluoro oxalate phosphate.

In some embodiments, the solvent may be selected from at least one of ethylene carbonate (EC), propylene carbonate, ethyl methyl carbonate, diethyl carbonate (DEC), dimethyl carbonate (DMC), dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

In some embodiments, the liquid electrolyte further optionally includes an additive. For example, the additive may include a negative electrode film-forming additive, a positive electrode film-forming additive, or may include an additive that can improve some performance of batteries, for example, an additive for improving over-charge performance of batteries, an additive for improving high-temperature performance or low-temperature performance of batteries, and the like.

[Separator]

In some embodiments, the secondary battery further includes a separator. The separator is not limited to any particular type in this application, and may be any well-known porous separator with good chemical stability and mechanical stability.

In some embodiments, a material of the separator may be selected from at least one of glass fiber, non-woven fabric, polyethylene, polypropylene, and polyvinylidene fluoride. The separator may be a single-layer film or a multi-layer composite film, and is not particularly limited. When the separator is a multi-layer composite film, all layers may be made of same or different materials, which is not particularly limited.

In some embodiments, the positive electrode plate, the negative electrode plate, and the separator may be made into an electrode assembly through winding or lamination.

In some embodiments, the secondary battery may include an outer package. The outer package is used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft package, for example, a soft pouch. A material of the soft pack may be plastic. As the plastic, polypropylene (PP), polybutylene terephthalate, and polybutylene succinate may be listed.

Figure 6:
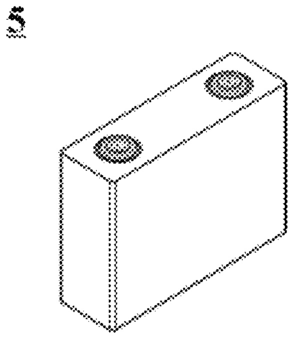
FIG. 6 is a schematic diagram of an embodiment of a secondary battery.

The secondary battery is not limited to any particular shape in this application, and may be cylindrical, rectangular, or any other shape. For example, FIG. 6 shows a secondary battery 5 of a rectangular structure as an example.

Figure 7:
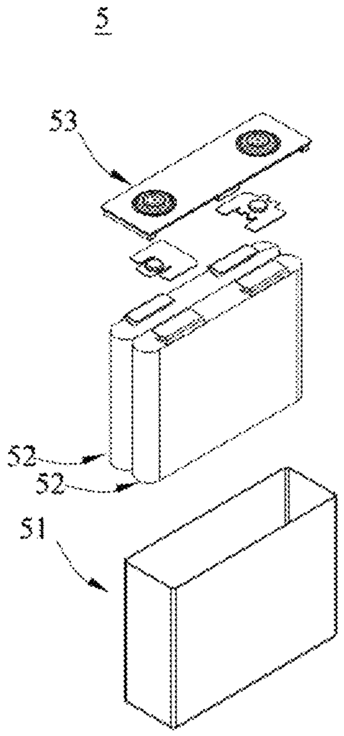
FIG. 7 is an exploded view of FIG. 6.

In some embodiments, referring to FIG. 7, the outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. There may be one or more electrode assemblies 52 in the secondary battery 5, and persons skilled in the art may make choices according to actual requirements.

In some embodiments, the secondary battery may be used to assemble a battery module, and the battery module may include one or more secondary batteries. The specific quantity may be chosen by persons skilled in the art based on use and capacity of the battery module.

Figure 8:
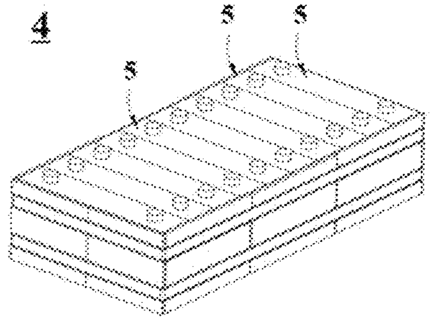
FIG. 8 is a schematic diagram of an embodiment of a battery module.

FIG. 8 shows a battery module 4 as an example. Refer to FIG. 8. In the battery module 4, a plurality of secondary batteries 5 may be sequentially arranged in a length direction of the battery module 4. Certainly, the batteries may alternatively be arranged in any other manners. Further, the plurality of secondary batteries 5 may be fastened through fasteners.

Optionally, the battery module 4 may further include a housing with an accommodating space, and the plurality of secondary batteries 5 are accommodated in the accommodating space.

In some embodiments, the battery module may be used to assemble a battery pack, one or more battery modules may be included in the battery pack, and the specific quantity may be chosen by persons skilled in the art based on use and capacity of the battery pack.

Figure 9:
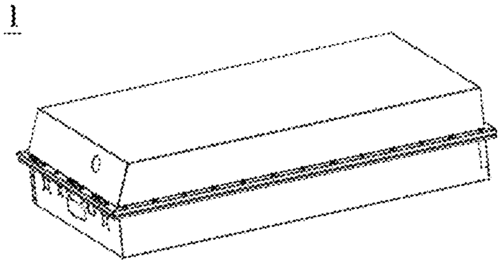
FIG. 9 is a schematic diagram of an embodiment of a battery pack.
Figure 10:
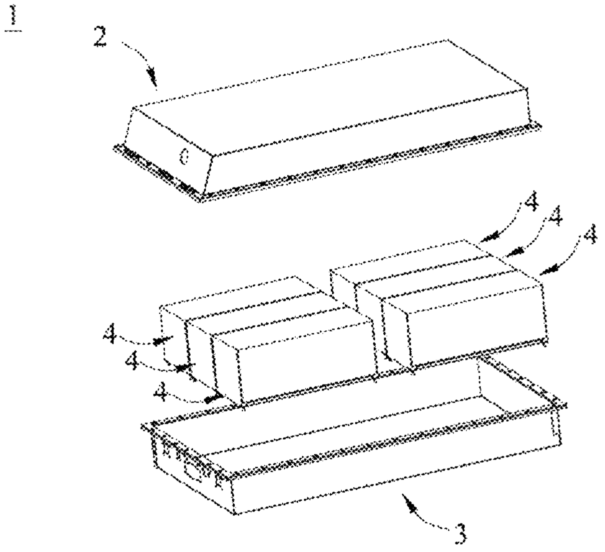
FIG. 10 is an exploded view of FIG. 9.

FIG. 9 and FIG. 10 show a battery pack 1 as an example. Refer to FIG. 9 and FIG. 10. The battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery module 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

The secondary battery, the battery module, or the battery pack may be selected for the electric apparatus based on requirements for using the electric apparatus.

Figure 11:
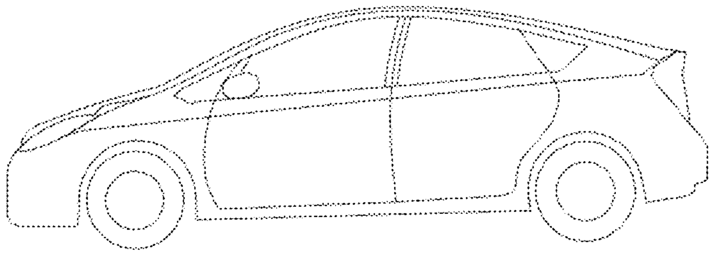
FIG. 11 is a schematic diagram of an embodiment of an electric apparatus using a secondary battery as a power source.

FIG. 11 shows an electric apparatus as an example. This electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the electric apparatus may be a mobile phone, a tablet computer, a notebook computer, or the like. The electric apparatus is usually required to be light and thin, and the secondary battery may be used as a power source.

EXAMPLES

The following describes examples of this application. The examples described below are illustrative and only used to explain this application, and cannot be construed as limitations on this application. Examples whose technical solutions or conditions are not specified are made in accordance with technical solutions or conditions described in literature in the field, or made in accordance with product instructions. The reagents or instruments used are all conventional products that are commercially available if no manufacturer is indicated.

Example 1

Synthesis of Ternary Precursor

S1. Nickel sulfate, cobalt sulfate, and manganese sulfate at a molar ratio of nickel, cobalt, and manganese of 95:3:2 were added into pure water to prepare a first mixed nickel-cobalt-manganese metal salt solution having a concentration of 2.0 mol/L, and nickel sulfate, cobalt sulfate, and manganese sulfate at a molar ratio of nickel, cobalt, and manganese of 90:5:5 were added into pure water to prepare a second mixed nickel-cobalt-manganese metal salt solution having a concentration of 2.0 mol/L.

S2. 20 L pure water was added into a 100 L first reactor as a base solution, a 5 mol/L NaOH solution was added to adjust a pH value of the base solution to 12.0, a 9 mol/L aqueous ammonia solution was added to adjust an ammonia concentration of the base solution to 0.4 mol/L, and then stirring was started, with a stirring linear velocity of 6 m/s and a reaction temperature of 45° C. maintained. The first mixed nickel-cobalt-manganese metal salt solution, the NaOH solution, and the ammonia aqueous solution were added to the first reactor, where a flow ratio of the first mixed nickel-cobalt-manganese metal salt solution to the NaOH solution was 5:4 and a flow ratio of the NaOH solution to the ammonia aqueous solution was 15:1, to maintain the pH value and the ammonia concentration in the first reactor unchanged, so as to continuously react to synthesize a seed crystal slurry.

S3. 20 L pure water was added into a 100 L second reactor as a base solution, a 2 kg seed crystal slurry was added, a 5 mol/L NaOH solution was added to adjust a pH value of the base solution to 11.5, a 9 mol/L aqueous ammonia solution was added to adjust an ammonia concentration of the base solution to 0.3 mol/L, and then stirring was started, with a stirring linear velocity of 5 m/s and a reaction temperature of 50° C. maintained. The second mixed nickel-cobalt-manganese metal salt solution, the NaOH solution, the ammonia aqueous solution, and the seed crystal slurry were added to the second reactor, where a flow ratio of the second mixed nickel-cobalt-manganese metal salt solution to the NaOH solution was 5:4, a flow ratio of the NaOH solution to the ammonia aqueous solution was 15:1, and a flow ratio of the seed crystal slurry to the second mixed nickel-cobalt-manganese metal salt solution was 0.15, to maintain the pH value and the ammonia concentration in the second reactor unchanged, so as to continuously react to synthesize a ternary precursor slurry. The slurry was then centrifuged at 300 rpm for 20 min, followed by deionized water washing, filtering, and drying at 105° C. for 10 h, to obtain a ternary precursor product. The final precursor product has an inner core of $[Ni_{0.95}Co_{0.03}Mn_{0.02}](OH)_2$ and a shell of $[Ni_{0.90}Co_{0.05}Mn_{0.05}](OH)_2$.

Synthesis of Ternary Positive Electrode Material (1) The foregoing synthesized ternary precursor, lithium hydroxide, and $ZrO_2$ were placed in a high-speed mixing device and mixed at 300 rpm for 1 h. A ratio of the mole number of lithium in lithium hydroxide to a sum of mole numbers of nickel, cobalt, and manganese in the ternary precursor was 1.0, and 3000 ppm of zirconium was used for doping. A resulting mixture was placed in an $O_2$ atmosphere furnace for primary sintering at a temperature of 700° C. for 10 h to obtain a primary material of a ternary positive electrode material doped with zirconium.

(2) The primary material and $Al_2O_3$ were placed in the mixing device, and mixed at 300 rpm for 1 h, where a coating amount of Al is 1000 ppm. A resulting mixture was placed in the $O_2$ atmosphere furnace for secondary sintering at a temperature of 500° C. for 7 h to form an Al-containing compound coating layer of the ternary positive electrode material to obtain the ternary positive electrode material.

Example 1-2

Preparation processes of the ternary precursor and the ternary positive electrode material basically followed that of Example 1-1, except that in step S2, the pH value was 12.1 and the stirring linear velocity was 6.2 m/s, and that in step S3, the pH value was 11.48 and the ammonia concentration was 0.34 mol/L.

Example 1-3

Preparation processes of the ternary precursor and the ternary positive electrode material basically followed that of Example 1-1, except that in step S2, the pH value was 12.2 and the stirring linear velocity was 6.4 m/s, and that in step S3, the pH value was 11.45 and the ammonia concentration was 0.36 mol/L.

Example 1-4

Preparation processes of the ternary precursor and the ternary positive electrode material basically followed that of Example 1-1, except that in step S2, the pH value was 12.3 and the stirring linear velocity was 7 m/s, and that in step S3, the pH value was 11.43 and the ammonia concentration was 0.40 mol/L.

Example 2-1

Preparation processes of the ternary precursor and the ternary positive electrode material basically followed that of Example 1-1, except that in step S2, the pH value was 12.5, the ammonia concentration was 0.2 mol/L, the stirring linear velocity was 7 m/s, and the reaction temperature was 40° C., and that in step S3, the pH value was 11.4 and the ammonia concentration was 0.5 mol/L.

Example 2-2

Preparation processes of the ternary precursor and the ternary positive electrode material basically followed that of Example 1-1, except that in step S2, the pH value was 12.3, the ammonia concentration was 0.25 mol/L, and the stirring linear velocity was 7 m/s, and that in step S3, the pH value was 11.4 and the ammonia concentration was 0.5 mol/L.

Example 2-3

Preparation processes of the ternary precursor and the ternary positive electrode material basically followed that of Example 1-1, except that in step S3, the pH value was 11.4 and the ammonia concentration was 0.5 mol/L.

Example 2-4

Preparation processes of the ternary precursor and the ternary positive electrode material basically followed that of Example 1-1, except that in step S2, the pH value was 11.5, the ammonia concentration was 0.6 mol/L, and the stirring linear velocity was 5 m/s, and that in step S3, the pH value was 11.4 and the ammonia concentration was 0.5 mol/L.

Example 2-5

Preparation processes of the ternary precursor and the ternary positive electrode material basically followed that of Example 1-1, except that in step S3, the pH value was 12, the ammonia concentration was 0.2 mol/L, and the stirring linear velocity was 6 m/s.

Example 2-6

Preparation processes of the ternary precursor and the ternary positive electrode material basically followed that of Example 1-1, except that in step S3, the pH value was 11.48, the ammonia concentration was 0.33 mol/L, and the stirring linear velocity was 5.2 m/s.

Example 2-7

Preparation processes of the ternary precursor and the ternary positive electrode material basically followed that of Example 1-1, except that in step S3, the pH value was 11, the ammonia concentration was 0.6 mol/L, and the stirring linear velocity was 3 m/s.

Example 3-1

Preparation processes of the ternary precursor and the ternary positive electrode material basically followed that of Example 1-1, except that in step S1, the molar ratio of nickel, cobalt, and manganese in the first mixed nickel-cobalt-manganese metal salt solution was 90:5:5.

Example 3-2

Preparation processes of the ternary precursor and the ternary positive electrode material basically followed that of Example 1-1, except that in step S1, the molar ratio of nickel, cobalt, and manganese in the first mixed nickel-cobalt-manganese metal salt solution was 85:10:5, and the molar ratio of nickel, cobalt, and manganese in the second mixed nickel-cobalt-manganese metal salt solution was 80:10:10.

Example 3-3

Preparation processes of the ternary precursor and the ternary positive electrode material basically followed that of Example 1-1, except that in step S1, the molar ratio of nickel, cobalt, and manganese in both the first and second mixed nickel-cobalt-manganese metal salt solutions was 80:10:10.

Example 4-1

Preparation processes of the ternary precursor and the ternary positive electrode material basically followed that of Example 1-1, except that in step S3, the pH value was 11.58 and the ammonia concentration was 0.22 mol/L.

Example 4-2

Preparation processes of the ternary precursor and the ternary positive electrode material basically followed that of Example 1-1, except that in step S3, the pH value was 11.56 and the ammonia concentration was 0.24 mol/L.

Example 4-3

Preparation processes of the ternary precursor and the ternary positive electrode material basically followed that of Example 1-1, except that in step S3, the pH value was 11.54 and the ammonia concentration was 0.26 mol/L.

Example 4-4

Preparation processes of the ternary precursor and the ternary positive electrode material basically followed that of Example 1-1, except that in step S3, the pH value was 11.53 and the ammonia concentration was 0.28 mol/L.

Example 4-5

Preparation processes of the ternary precursor and the ternary positive electrode material basically followed that of Example 1-1, except that in step S3, the pH value was 11.47 and the ammonia concentration was 0.35 mol/L.

Example 4-6

Preparation processes of the ternary precursor and the ternary positive electrode material basically followed that of Example 1-1, except that in step S3, the pH value was 11.58 and the ammonia concentration was 0.15 mol/L.

Example 5-1

Preparation processes of the ternary precursor and the ternary positive electrode material basically followed that of Example 1-1, except that in step S3, the ammonia concentration was 0.22 mol/L.

Example 5-2

Preparation processes of the ternary precursor and the ternary positive electrode material basically followed that of Example 1-1, except that in step S3, the ammonia concentration was 0.28 mol/L.

Example 5-3

Preparation processes of the ternary precursor and the ternary positive electrode material basically followed that of Example 1-1, except that in step S3, the ammonia concentration was 0.4 mol/L.

Example 5-4

Preparation processes of the ternary precursor and the ternary positive electrode material basically followed that of Example 1-1, except that in step S3, the ammonia concentration was 0.55 mol/L.

Example 6-1

Preparation processes of the ternary precursor and the ternary positive electrode material basically followed that of Example 1-1, except that in step S3, the pH value was 11.25 and the ammonia concentration was 0.24 mol/L.

Example 6-2

Preparation processes of the ternary precursor and the ternary positive electrode material basically followed that of Example 1-1, except that in step S3, the pH value was 11.4 and the ammonia concentration was 0.28 mol/L.

Example 6-3

Preparation processes of the ternary precursor and the ternary positive electrode material basically followed that of Example 1-1, except that in step S3, the pH value was 11.55 and the ammonia concentration was 0.33 mol/L.

Example 6-4

Preparation processes of the ternary precursor and the ternary positive electrode material basically followed that of Example 1-1, except that in step S3, the pH value was 11.7 and the ammonia concentration was 0.4 mol/L.

Example 6-5

Preparation processes of the ternary precursor and the ternary positive electrode material basically followed that of Example 1-1, except that in step S3, the pH value was 11.9 and the ammonia concentration was 0.55 mol/L.

Example 6-6

Preparation processes of the ternary precursor and the ternary positive electrode material basically followed that of Example 1-1, except that in step S3, the pH value was 10.95 and the ammonia concentration was 0.15 mol/L.

Example 6-7

Preparation processes of the ternary precursor and the ternary positive electrode material basically followed that of Example 1-1, except that in step S3, the pH value was 12.05 and the ammonia concentration was 0.8 mol/L.

Example 7-1

Preparation processes of the ternary precursor and the ternary positive electrode material basically followed that of Example 1-1, except that in step S2, the pH value was 12.1 and the stirring linear velocity was 6.2 m/s, and that in step S3, the pH value was 11.52 and the ammonia concentration was 0.32 mol/L.

Example 7-2

Preparation processes of the ternary precursor and the ternary positive electrode material basically followed that of Example 1-1, except that in step S2, the pH value was 12.15 and the stirring linear velocity was 6.3 m/s, and that in step S3, the pH value was 11.48 and the ammonia concentration was 0.34 mol/L.

Example 7-3

Preparation processes of the ternary precursor and the ternary positive electrode material basically followed that of Example 1-1, except that in step S2, the pH value was 12.2 and the stirring linear velocity was 6.5 m/s, and that in step S3, the pH value was 11.45 and the ammonia concentration was 0.36 mol/L.

Example 7-4

Preparation processes of the ternary precursor and the ternary positive electrode material basically followed that of Example 1-1, except that in step S2, the pH value was 12.3 and the stirring linear velocity was 6.8 m/s, and that in step S3, the pH value was 11.43 and the ammonia concentration was 0.38 mol/L.

Comparative Example 7-1

Preparation processes of the ternary precursor and the ternary positive electrode material basically followed that of Example 1-1, except that in step S2, the pH value was 12.6, the ammonia concentration was 0.8 mol/L, and the stirring linear velocity was 4.5 m/s, and that in step S3, the pH value was 12.1, the ammonia concentration was 0.9 mol/L, and that in step (1), no $ZrO_2$ was added.

Example 8-1

Preparation processes of the ternary precursor and the ternary positive electrode material basically followed that of Example 1-1, except that in step (1), $ZrO_2$ was replaced with $TiO_2$.

Example 8-2

Preparation processes of the ternary precursor and the ternary positive electrode material basically followed that of Example 1-1, except that in step (1), $ZrO_2$ was replaced with $SrCO_3$.

Example 8-3

Preparation processes of the ternary precursor and the ternary positive electrode material basically followed that of Example 1-1, except that in step (1), $ZrO_2$ was replaced with $Sb_2O_5$.

Comparative Example 1

Preparation processes of the ternary precursor and the ternary positive electrode material basically followed that of Example 1-1, except that in step S3 the second mixed nickel-cobalt-manganese metal salt solution, the NaOH solution, and the ammonia solution were added into the second reactor.

Comparative Example 2

Preparation processes of the ternary precursor and the ternary positive electrode material basically followed that of Example 1-1, except that the ternary precursor was prepared in the following method: 20 L pure water was added as a base solution in a 100 L reactor, a 5 mol/L NaOH solution was added to adjust a pH value of the base solution to 11.5, a 9 mol/L aqueous ammonia solution was added to adjust the ammonia concentration of the base solution to 0.3 mol/L, stirring was started at a linear velocity of 5 m/s, and a reaction temperature of 50° C. was maintained. A mixed nickel-cobalt-manganese metal salt solution having a concentration of 2.0 mol/L (with a molar ratio 90:5:5 of nickel, cobalt, and manganese), a NaOH solution, and an ammonia aqueous solution were added to the reactor, where a flow ratio of the mixed nickel-cobalt-manganese metal salt solution to the NaOH solution was 5:4, and a flow ratio of the NaOH solution to the ammonia aqueous solution was 15:1, to maintain the pH value and the ammonia concentration in the reactor unchanged, so as to continuously react to synthesize a ternary precursor slurry. The slurry was then centrifuged, washed, filtered, and dried to obtain a high-nickel ternary precursor product. The molecular formula of the final precursor product was $[Ni_{0.90}Co_{0.05}Mn_{0.05}](OH)_2$.

[Related Parameters and Battery Performance Test]

1. Deformation Stacking Fault Probability $f_D$

The deformation stacking fault probability $f_D$ of the ternary precursor was tested in the following method: firstly, a Bruker D8DISCOER X-ray diffractometer was used to perform X-ray diffraction on the precursor powder, and then perform a slow (1°/min) scan at a 2θ angle of 10-70°; secondly, spectral fitting is performed to obtain diffraction peak related parameters of the (001) crystal plane, (101) crystal plane, or (102) crystal plane; and thirdly, the related parameters were substituted into the expression to find the deformation stacking fault probability.

2. Inner Core Radius and Shell Thickness

The inner core radius and shell thickness of the particles of the ternary precursor were tested in the following method: cross-sectional screenshots of the ternary precursor were measured using a Zeiss SIGMA 300 scanning electron microscope SEM. To ensure the accuracy of test values, a plurality (for example, 20) of cross-sections of the particles of the ternary precursor might be taken to measure respective inner core radii and shell thicknesses so as to calculate an average value.

3. Cracking Rate

The cracking rate of the particles of the ternary precursor was tested in the following method: firstly, a pressurized environment was created with external force by following a compacted density test method, and original powder and compacted powder were placed in separate bags for storage; and secondly, the two bags of powder were placed in a laser particle size analyzer for test, indexes $D_v1$ were output, and data were substituted into a cracking rate formula to find a corresponding numerical value. The compacted density test method included compacting the sample in a specific mold with a pressure of 5 tons to obtain a thickness of the sample, and computing the compacted density according to $\rho_c=m/V=m/(S*H)$, where m is a material weight, S is a powder area, and H is a powder height.

4. Volume-Based Particle Size

The volume-based particle size was tested by using a Malvern 2000 device in accordance with the GB/T 19077-2016/ISO 13320:2009 "Particle size distribution laser diffraction method". A clean beaker was taken, added with an appropriate amount of a sample under test until a shading degree was 8%-12%, and then added with 20 ml deionized water. A resulting mixture was subjected to external ultrasound for 5 min, and then a particle size tester was powered on to start testing.

5. Specific Surface Area BET

The specific surface area BET of the ternary precursor was measured using a TriStar II 3020 device in accordance with the GB/T 19587-2017 "Determination of specific surface area of solid substances by gas adsorption BET method". A dedicated sample tube for crystallization was taken, a test sample was added into the sample tube with a sampling spoon until the sample reached ⅔ of the bulb, and then the outside of the tube was wiped clean with dust-free paper. Then the sample tube was loaded to a degassing station of the device so as to degas the sample tube. Finally, the sample was placed into an analysis station for sample analysis.

6. Tap Density TD

The tap density TD of the ternary precursor was tested by using a tap density tester in accordance with GB/T 5162-2006 "Metallic powders-determination of tap density". Firstly, a clean and dry 100 ml graduated cylinder was weighed as $m_0$ g, filled with a specific amount of powder sample and weighted as $m_1$ g. The graduated cylinder filled with the powder material was placed onto a tap density tester which was then started and set with a vibration frequency of 5000 times. After vibration, a volume V $cm^3$ was taken. The tap density was equal to $(m_1-m_0)/V$, measured in $g/cm^3$.

7. Test Method for Inner Core and Shell Compositions

A glue for sample preparation (dispersing PVDF into N-methylpyrrolidone, with a proportion of PVDF being about 8%) and sample powder were mixed uniform (the powder is about 5 times the weight of the glue) and applied onto a copper foil, which was then dried at 60° C. for 30 min. The prepared sample was cut into pieces with a size of 6 mm by 6 mm using a scissor. A sample piece was fixed on a sample stage and put into an ion polisher (model: IB-19500CP). An edge of the sample piece was adjusted to be parallel to the center line: the X axis, with a distance of 40-60 μm to the Y axis, and then cutting was performed. After cutting, an X-Max energy spectrometer (EDS) of Oxford Instruments Group in the UK and a Sigma-02-33 scanning electron microscope (SEM) of Zeiss in Germany were used together to select a suitable particle section on the cut sample. 3 sites were selected on both the inner core and the shell for Ni, Co, and Mn composition test, an average value was used as a Ni, Co, or Mn mass percentage, and a molar ratio of Ni, Co, and Mn was calculated.

8. Preparation of Button Cell

The ternary positive electrode material prepared in the foregoing examples and comparative examples, PVDF, and conductive carbon were added at a weight ratio of 90:5:5 into N-methylpyrrolidone and stirred in a drying room to obtain a slurry. The slurry was applied onto an aluminum foil, followed by drying and cold pressing, to obtain a positive electrode plate. A lithium sheet was used as a negative electrode plate, an electrolyte was 1 mol/L $LiPF_6$/(EC+DEC+DMC) (at a volume ratio of 1:1:1), and a button cell was assembled in a button cell box.

Method for Testing Initial Gram Capacity of Button Cell

The foregoing prepared button cell was charged to 4.3 V at 0.1C under a voltage of 2.8-4.3 V, and then was charged at a constant voltage of 4.3 V to a current less than or equal to 0.05 mA. After the button cell was left standing for 2 min, a charge capacity at that point was recorded as $Co_0$. Then, the button cell was discharged to 2.8 V at 0.1C, and a discharge capacity at that point was an initial gram capacity and recorded as $D_0$. The first-cycle efficiency was $D_0/C_0$*100%.

9. Preparation of Full Cell

The ternary positive electrode materials prepared in the foregoing examples and comparative examples were used as a positive electrode active substance. The positive electrode active substance, a conductive agent acetylene black, and a binder PVDF at a weight ratio of 94:3:3 were fully stirred and uniformly mixed in an N-methylpyrrolidone solvent system, and then a resulting mixture was applied onto an aluminum foil, followed by drying and cold pressing, to obtain a positive electrode plate. A negative electrode active material artificial graphite, hard carbon, a conductive agent acetylene black, a binder SBR, and a thickener sodium carboxymethyl cellulose (CMC) at a weight ratio of 90:5:2:2:1 were fully stirred and mixed uniform in a deionized water solvent system, and then a resulting mixture was applied onto a copper foil, followed by drying and cold pressing to obtain a negative electrode plate. A porous polyethylene polymeric film was used as a separator. The positive electrode plate, the separator, and the negative electrode plate were stacked in order, so that the separator was placed between the positive and negative electrodes for separation, and winding was performed to obtain a bare cell. The bare cell was placed in an outer package, the prepared electrolyte, that is 1 mol/L $LiPF_6$/(EC+DEC+DMC) (at a volume ratio of 1:1:1), was injected, and then the outer package was sealed to obtain a full cell.

Method for Testing Initial Gram Capacity of Full Cell

The foregoing prepared full cell was left standing for 5 min at a constant temperature of 25° C., and was discharged to 2.8 V at ⅓C. After being left standing for 5 min, the full cell was charged to 4.25 V at ⅓C, and was charged at a constant voltage of 4.25 V to a current less than or equal to 0.05 mA. After the full cell was left standing for 5 min, a charge capacity at that point was recorded as $Co_0$. Then, the full cell was discharged to 2.8 V at ⅓C, and a discharge capacity at that point was an initial gram capacity and recorded as $D_0$.

Cycling Performance Test for Full Cell at 25° C./45° C.

The prepared full cell was charged to 4.25 V at 1C under a voltage of 2.8-4.25 V at a constant temperature of 25° C. or 45° C., and then was charged at a constant voltage of 4.25 V to a current less than or equal to 0.05 mA. After being left standing for 5 min, the full cell was discharged to 2.8 V at 1C, and a capacity was recorded as $D_0$. The foregoing process was repeated for 300 times, a capacity was recorded as $D_0$ (n=1, 2, . . . ), and a capacity retention rate after 300 cycles was calculated as: $(D_{300}-D_0)/D_0$*100%.

10. Swelling Test for Full Cell at 70° C.

The full cell with 100% S° C. (remaining capacity) was stored at 70° C. An OCV (open circuit voltage), IMP (impedance), volume (drainage method test) of the cell were measured before, during, and after storage. A residual capacity and reversible capacity of the cell were tested at the end of storage. The full cell was baked every 48 h, and left standing for 1 h, followed by OCV and IMP test. After the full cell was cooled to room temperature, a volume of the cell was tested in the drainage method. The test was finished after 30 days of storage, or storage continues until the volume swelled more than 50%. A protection voltage range was 2.7-4.3 V, and a nominal capacity was 2.25 Ah.

The foregoing examples and comparative examples were tested respectively according to the foregoing processes, and the specific values are shown in Table 1 to Table 9.

TABLE 1

Impact of deformation stacking fault probability of ternary precursor on battery performance

| No. | Ternary precursor Deformation stacking fault probability | Battery performance: Button cell capacity at 0.1 C (mAh/g) | First-cycle efficiency (%) | Fully cell capacity at ⅓ C (mAh/g) | Cycling capacity retention rate at 25° C. (%) | Cycling capacity retention rate at 45° C. (%) | Swelling volume after 30-day storage at 70° C. (mL/Ah) |
|---|---|---|---|---|---|---|---|
| Example 1-1 | 2.5 | 222 | 92.1 | 213 | 96.0 | 92.3 | 5.2 |
| Example 1-2 | 2.3 | 224 | 92.3 | 214 | 96.2 | 92.5 | 5.4 |
| Example 1-3 | 1.9 | 225 | 92.4 | 216 | 96.3 | 92.6 | 5.7 |
| Example 1-4 | 1.5 | 227 | 92.6 | 217 | 96.5 | 92.8 | 5.3 |

Note:
The ternary precursor has an inner core of $[Ni_{0.95}Co_{0.03}Mn_{0.02}](OH)_2$ and a shell of $[Ni_{0.90}Co_{0.05}Mn_{0.05}](OH)_2$.

TABLE 2

Impact of inner core radius and shell thickness of ternary precursor on battery performance

| No. | Ternary precursor: Inner core radius (μm) | Ternary precursor: Shell thickness (μm) | Battery performance: Button cell capacity at 0.1 C (mAh/g) | First-cycle efficiency (%) | Fully cell capacity at ⅓ C (mAh/g) | Cycling capacity retention rate at 25° C. (%) | Cycling capacity retention rate at 45° C. (%) | Swelling volume after 30-day storage at 70° C. (mL/Ah) |
|---|---|---|---|---|---|---|---|---|
| Example 2-1 | 0.1 | 7 | 222 | 92.8 | 213 | 96.8 | 93.1 | 5.6 |
| Example 2-2 | 1 | 7 | 225 | 92.7 | 216 | 96.5 | 92.9 | 5.8 |
| Example 2-3 | 3 | 7 | 229 | 92.6 | 218 | 96.4 | 92.7 | 5.9 |
| Example 2-4 | 6 | 7 | 231 | 92.8 | 220 | 96.2 | 92.5 | 6.2 |
| Example 2-5 | 3 | 2 | 227 | 92.7 | 217 | 95.8 | 92.0 | 6.8 |
| Example 2-6 | 3 | 5 | 224 | 92.4 | 215 | 96.1 | 92.3 | 6.5 |
| Example 2-7 | 3 | 10 | 222 | 92.5 | 214 | 96.5 | 92.6 | 5.8 |

Note:
The ternary precursor has an inner core of $[Ni_{0.95}Co_{0.03}Mn_{0.02}](OH)_2$ and a shell of $[Ni_{0.90}Co_{0.05}Mn_{0.05}](OH)_2$.

TABLE 3

Impact of inner core and shell composition of ternary precursor on battery performance

| No. | Ternary precursor: Inner core | Ternary precursor: Shell | Ternary precursor: Deformation stacking fault probability | Battery performance: Button cell capacity at 0.1 C (mAh/g) |
|---|---|---|---|---|
| Example 1-1 | $[Ni_{0.95}Co_{0.03}Mn_{0.02}](OH)_2$ | $[Ni_{0.90}Co_{0.05}Mn_{0.05}](OH)_2$ | 2.5 | 222 |
| Example 3-1 | $[Ni_{0.90}Co_{0.05}Mn_{0.05}](OH)_2$ | $[Ni_{0.90}Co_{0.05}Mn_{0.05}](OH)_2$ | 2.5 | 220 |
| Example 3-2 | $[Ni_{0.85}Co_{0.10}Mn_{0.05}](OH)_2$ | $[Ni_{0.80}Co_{0.10}Mn_{0.10}](OH)_2$ | 2.5 | 216 |
| Example 3-3 | $[Ni_{0.80}Co_{0.10}Mn_{0.10}](OH)_2$ | $[Ni_{0.80}Co_{0.10}Mn_{0.10}](OH)_2$ | 2.5 | 210 |

| No. | Battery performance: First-cycle efficiency (%) | Fully cell capacity at ⅓ C (mAh/g) | Cycling capacity retention rate at 25° C. (%) | Cycling capacity retention rate at 45° C. (%) | Swelling volume after 30-day storage at 70° C. (mL/Ah) |
|---|---|---|---|---|---|
| Example 1-1 | 92.1 | 213 | 96.0 | 92.3 | 5.2 |
| Example 3-1 | 92.6 | 211 | 96.5 | 92.7 | 5.3 |
| Example 3-2 | 92.7 | 206 | 96.9 | 93.1 | 5.1 |
| Example 3-3 | 93.1 | 201 | 97.4 | 93.7 | 4.5 |

TABLE 4

Impact of volume distribution span (($D_v90 - D_v10)/D_v50$) of ternary precursor on battery performance

| No. | Ternary precursor | | Battery performance | | | | | |
|---|---|---|---|---|---|---|---|---|
| | Volume distribution span | Tap density (g/cm$^3$) | Button cell capacity at 0.1 C (mAh/g) | First-cycle efficiency (%) | Fully cell capacity at ⅓ C (mAh/g) | Cycling capacity retention rate at 25° C. (%) | Cycling capacity retention rate at 45° C. (%) | Swelling volume after 30-day storage at 70° C. (mL/Ah) |
| Example 4-1 | 1.3 | 1.91 | 222 | 92.5 | 213 | 96.1 | 92.4 | 5.4 |
| Example 4-2 | 1.32 | 1.98 | 220 | 92.4 | 211 | 96.3 | 92.6 | 5.6 |
| Example 4-3 | 1.35 | 2.05 | 222 | 92.6 | 212 | 96.5 | 92.7 | 5.5 |
| Example 4-4 | 1.38 | 2.17 | 221 | 92.4 | 212 | 96.6 | 92.9 | 5.7 |
| Example 4-5 | 1.42 | 2.22 | 223 | 92.7 | 213 | 96.8 | 93.1 | 5.4 |
| Example 4-6 | 1.15 | 1.85 | 221 | 92.1 | 211 | 95.1 | 90.9 | 7.5 |

Note:
The ternary precursor has an inner core of $[Ni_{0.95}Co_{0.03}Mn_{0.02}](OH)_2$ and a shell of $[Ni_{0.90}Co_{0.05}Mn_{0.05}](OH)_2$.

TABLE 5

Impact of volume-based median particle size $D_v50$ of ternary precursor on battery performance

| No. | Ternary precursor $D_v50$ (μm) | Battery performance | | | | | |
|---|---|---|---|---|---|---|---|
| | | Button cell capacity at 0.1 C (mAh/g) | First-cycle efficiency (%) | Fully cell capacity at ⅓ C (mAh/g) | Cycling capacity retention rate at 25° C. (%) | Cycling capacity retention rate at 45° C. (%) | Swelling volume after 30-day storage at 70° C. (mL/Ah) |
| Example 5-1 | 5.2 | 228 | 92.5 | 216 | 96.2 | 92.6 | 6.4 |
| Example 5-2 | 7.4 | 226 | 92.4 | 214 | 96.4 | 92.8 | 6.1 |
| Example 5-3 | 9.3 | 225 | 92.6 | 212 | 96.7 | 93.0 | 5.8 |
| Example 5-4 | 14.5 | 222 | 92.8 | 210 | 96.9 | 93.1 | 5.5 |

Note:
The ternary precursor has an inner core of $[Ni_{0.95}Co_{0.03}Mn_{0.02}](OH)_2$ and a shell of $[Ni_{0.90}Co_{0.05}Mn_{0.05}](OH)_2$.

TABLE 6

Impact of BET of ternary precursor on battery performance

| No. | Ternary precursor BET (m$^2$/g) | Battery performance | | | | | |
|---|---|---|---|---|---|---|---|
| | | Button cell capacity at 0.1 C (mAh/g) | First-cycle efficiency (%) | Fully cell capacity at ⅓ C (mAh/g) | Cycling capacity retention rate at 25° C. (%) | Cycling capacity retention rate at 45° C. (%) | Swelling volume after 30-day storage at 70° C. (mL/Ah) |
| Example 6-1 | 5.6 | 223 | 92.6 | 213 | 96.2 | 92.5 | 5.3 |
| Example 6-2 | 7.2 | 224 | 92.5 | 214 | 96.5 | 92.7 | 5.8 |
| Example 6-3 | 10.5 | 226 | 92.7 | 215 | 96.8 | 92.8 | 5.7 |
| Example 6-4 | 15 | 227 | 92.6 | 217 | 96.4 | 92.5 | 6.1 |
| Example 6-5 | 18.7 | 224 | 92.5 | 213 | 96.1 | 92.2 | 6.4 |
| Example 6-6 | 4.7 | 219 | 92.3 | 208 | 95.0 | 91.0 | 5.6 |
| Example 6-7 | 22 | 226 | 92.4 | 215 | 94.7 | 90.7 | 7.6 |

Note:
The ternary precursor has an inner core of $[Ni_{0.95}Co_{0.03}Mn_{0.02}](OH)_2$ and a shell of $[Ni_{0.90}Co_{0.05}Mn_{0.05}](OH)_2$.

TABLE 7

Impact of cracking rate of particles of ternary precursor under pressure of 5 tons on battery performance

| No. | Ternary precursor: Deformation stacking fault probability | Ternary precursor: Cracking rate (%) | Battery performance: Button cell capacity at 0.1 C (mAh/g) | First-cycle efficiency (%) | Fully cell capacity at ⅓ C (mAh/g) | Cycling capacity retention rate at 25° C. (%) | Cycling capacity retention rate at 45° C. (%) | Swelling volume after 30-day storage at 70° C. (mL/Ah) |
|---|---|---|---|---|---|---|---|---|
| Example 7-1 | 2.3 | 19.8 | 226 | 92.5 | 216 | 96.1 | 92.4 | 6.1 |
| Example 7-2 | 2.1 | 17.4 | 225 | 92.4 | 215 | 96.3 | 92.6 | 5.8 |
| Example 7-3 | 1.9 | 15.3 | 227 | 92.6 | 218 | 96.6 | 92.8 | 5.9 |
| Example 7-4 | 1.7 | 12.9 | 226 | 92.5 | 215 | 96.9 | 92.9 | 5.6 |
| Comparative Example 7-1 | 2.9 | 28.5 | 224 | 92.3 | 212 | 94.1 | 90.2 | 7.9 |

Note:
The ternary precursor has an inner core of $[Ni_{0.95}Co_{0.03}Mn_{0.02}](OH)_2$ and a shell of $[Ni_{0.90}Co_{0.05}Mn_{0.05}](OH)_2$.

TABLE 8

Impact of doping of ternary positive electrode material on battery performance

| No. | Ternary positive electrode material Doping element | Battery performance: Button cell capacity at 0.1 C (mAh/g) | First-cycle efficiency (%) | Fully cell capacity at ⅓ C (mAh/g) | Cycling capacity retention rate at 25° C. (%) | Cycling capacity retention rate at 45° C. (%) | Swelling volume after 30-day storage at 70° C. (mL/Ah) |
|---|---|---|---|---|---|---|---|
| Example 1-1 | Zr | 222 | 92.1 | 213 | 96.0 | 92.3 | 5.2 |
| Example 8-1 | Ti | 223 | 92.2 | 214 | 96.1 | 92.4 | 5.4 |
| Example 8-2 | Sr | 222 | 92.1 | 212 | 96.2 | 92.2 | 5.6 |
| Example 8-3 | Sb | 223 | 92.3 | 213 | 96.1 | 92.4 | 5.7 |

Note:
The ternary precursor has an inner core of $[Ni_{0.95}Co_{0.03}Mn_{0.02}](OH)_2$ and a shell of $[Ni_{0.90}Co_{0.05}Mn_{0.05}](OH)_2$.

TABLE 9

Impact of technical preparation parameter of ternary precursor on battery performance

| | Ternary precursor Deformation stacking fault probability | Battery performance: Button cell capacity at 0.1 C (mAh/g) | First-cycle efficiency (%) | Fully cell capacity at ⅓ C (mAh/g) | Cycling capacity retention rate at 25° C. (%) | Cycling capacity retention rate at 45° C. (%) | Swelling volume after 30-day storage at 70° C. (mL/Ah) |
|---|---|---|---|---|---|---|---|
| Comparative Example 1 | 3.8 | 221 | 91.9 | 210 | 90.5 | 86.5 | 15.0 |
| Comparative Example 2 | 4.2 | 219 | 91.6 | 208 | 89.8 | 85.7 | 13.5 |

It can be learned from Table 1 and Table 9 that all examples in table 1 are higher than Comparative Examples 1 and 2 in terms of the corresponding button cell capacities at 0.1C, first-cycle efficiencies, full cell capacities at ⅓C, cycling capacity retention rates at 25° C. after 300 cycles, cycling capacity retention rates at 45° C. after 300 cycles and that all examples are lower than Comparative Examples 1 and 2 in terms of swelling volume after 30-day storage at 70° C.

By comprehensive comparison of Examples 1-1 to 1-4, when the deformation stacking fault probability of the ternary precursor is ≤2.5%, the button cell capacities at 0.1C are all higher than 222 mAh/g, the first-cycle efficiencies are all higher than 92.1%, the full cell capacities at ⅓C are all higher than 213 mAh/g, the cycling capacity retention rates at 25° C. after 300 cycles are all higher than 96.0%, the cycling capacity retention rates at 45° C. after 300 cycles are all higher than 92.3%, and the swelling volume after 30-day storage at 70° C. are all within 5.2 mL/Ah.

By comprehensive comparison of Examples 2-1 to 2-7, when the inner core radius of the ternary precursor is 0.1-6 μm and the shell thickness thereof is 2-10 μm, the button cell capacities at 0.1C are all higher than 222 mAh/g, the first-cycle efficiencies are all higher than 92.4%, the full cell capacities at ⅓C are all higher than 213 mAh/g, the cycling capacity retention rates at 25° C. after 300 cycles are all higher than 95.8%, and the cycling capacity retention rates at 45° C. after 300 cycles are all higher than 92.0%.

By comprehensive comparison of Example 1-1 and Examples 3-1 to 3-3, when the Ni content in the inner core of the ternary precursor is higher than or equal to the Ni content in the shell, the button cell capacities at 0.1C, the first-cycle efficiencies, the full cell capacities at ⅓C, the cycling capacity retention rates at 25° C. after 300 cycles, and the cycling capacity retention rates at 45° C. after 300 cycles are all good.

By comprehensive comparison of Examples 4-1 to 4-6, when the volume distribution span $(D_v90-D_v10)/D_v50$ of the ternary precursor is ≥1.3, the button cell capacities at 0.1C are all higher than 220 mAh/g, the first-cycle efficiencies are all higher than 92.4%, the full cell capacities at ⅓C are all higher than 211 mAh/g, the cycling capacity retention rates at 25° C. after 300 cycles are all higher than 96.1%, the cycling capacity retention rates at 45° C. after 300 cycles are all higher than 92.4%, and the 70° C. 30-day swelling volumes are all within 5.7 mL/Ah.

By comprehensive comparison of Examples 5-1 to 5-4, when the volume-based median particle size $D_v50$ of the ternary precursor is 5-15 μm, the button cell capacities at 0.1C are all higher than 222 mAh/g, the first-cycle efficiencies are all higher than 92.4%, the full cell capacities at ⅓C are all higher than 210 mAh/g, the cycling capacity retention rates at 25° C. after 300 cycles are all higher than 96.2%, and the cycling capacity retention rates at 45° C. after 300 cycles are all higher than 92.6%. Further, when $D_v50$ is 5-10 μm, the button cell capacities at 0.1C and the full cell capacities at ⅓C are all further increased.

By comprehensive comparison of Examples 6-1 to 6-7, when the BET of the ternary precursor is within 5-20 $m^2/g$, the button cell capacities at 0.1C are all higher than 223 mAh/g, the first-cycle efficiencies are all higher than 92.5%, the full cell capacities at ⅓C are all higher than 213 mAh/g, the cycling capacity retention rates at 25° C. after 300 cycles are all higher than 96.1%, and the cycling capacity retention rates at 45° C. after 300 cycles are all higher than 92.2%. Further, when the BET is within 7-15 $m^2/g$, the button cell capacities at 0.1C, the first-cycle efficiencies, the full cell capacities at ⅓C, the cycling capacity retention rates at 25° C. after 300 cycles, and the cycling capacity retention rates at 45° C. after 300 cycles are all further increased.

By comprehensive comparison of Examples 7-1 to 7-4 and Comparative Example 7-1, when the deformation stacking fault probability is ≤2.5% and when the cracking rate under the pressure of 5 tons is ≤20.0%, the button cell capacities at 0.1C are all higher than 225 mAh/g, the first-cycle efficiencies are all higher than 92.4%, the full cell capacities at ⅓C are all higher than 215 mAh/g, the cycling capacity retention rates at 25° C. after 300 cycles are all higher than 96.1%, and the cycling capacity retention rates at 45° C. after 300 cycles are all higher than 92.4%.

By comprehensive comparison of Example 1-1 and Examples 8-1 to 8-3, when the ternary positive electrode materials are doped with these elements, the button cell capacities at 0.1C, the first-cycle efficiencies, the full cell capacities at ⅓C, the cycling capacity retention rates at 25° C. after 300 cycles, the cycling capacity retention rates at 45° C. after 300 cycles, and the swelling volume after 30-day storage at 70° C. are all good.

In Comparative Example 1, in the preparation of the ternary precursor, in the process of shell formation and nucleus growth, no seed crystal slurry synthesized in step S2 is continuously added. As compared with Example 1, both nucleation and nucleus growth take place in the latter continuous production stage, and therefore it is difficult to control the process. This can neither help to produce products with good radial distribution nor synthesize products with an inner core-shell structure, resulting in low capacity, poor cycling, and high swelling rate of batteries. In Comparative Example 2, in the process of preparing the ternary precursor, the step S2 of seed crystal synthesis is omitted. Therefore, during the entire continuous growth process of the precursor, both nucleation and nucleus growth take place. Consequently, the synthesized precursor product has a high stacking fault probability, resulting in low capacity, poor cycling, and high swelling rate of batteries.

It should be noted that this application is not limited to the foregoing embodiments. The foregoing embodiments are merely examples, and embodiments having substantially the same constructions and having the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

What is claimed is:

1. A ternary precursor, wherein primary particles or whiskers of the ternary precursor are distributed in a radial direction; and a deformation stacking fault probability $f_D$ of the ternary precursor is ≤2.5%, and the deformation stacking fault probability $f_D$ is calculated as follows:

$$f_D=0.1552\times B(101)-0.03233\times B(102)-0.4399/D(001),$$

where B (101) is a full width at half maximum in an X-ray diffraction pattern of a (101) crystal plane of the ternary precursor, B (102) is a full width at half maximum in an X-ray diffraction pattern of a (102) crystal plane of the ternary precursor, and D (001) is a full width at half maximum in an X-ray diffraction pattern of a (001) crystal plane of the ternary precursor, where the full widths at half maximum are measured in degrees;

wherein the ternary precursor comprises an inner core and a shell enclosing the inner core, a radius R of the inner core is 0.1-6.0 μm, and a thickness h of the shell is 2-10 μm;

wherein a molecular formula of the inner core is $[Ni_xCo_yMn_{(1-x-y)}](OH)_2$, wherein $0.8\le x<1.0, 0<y<0.2$, and $x+y<1$;

a molecular formula of the shell is $[Ni_aCo_bMn_{(1-a-b)}](OH)_2$, wherein $0.8\le a<1.0$, $0<b<0.2$, and $a+b<1$; and Ni contents in the inner core and the shell make the following relationship hold: $a\le x$.

2. The ternary precursor according to claim 1, wherein a volume distribution span of particles of the ternary precursor is $(D_v90-D_v10)/D_v50\ge1.3$.

3. The ternary precursor according to according to claim 1, wherein a volume-based median particle size $D_v50$ of particles of the ternary precursor is 5-15 μm.

4. The ternary precursor according to according to claim 1, wherein a specific surface area BET of particles of the ternary precursor is ≥5-20 $m^2/g$.

5. The ternary precursor according to claim 1, wherein a tap density (TD) of particles of the ternary precursor is ≥1.9 $g/cm^3$.

6. The ternary precursor according to claim 1, wherein a cracking rate of particles of the ternary precursor is ≤20% at a pressure of 5 tons, wherein an expression of the cracking rate is a $\alpha$=[$D_v$1 (before compression)-$D_v$1 (after compression)]/$D_v$1 (before compression), wherein $D_v$1 (before compression) is a particle size at which cumulative distribution by volume of the ternary precursor before compression reaches 1% as counted from the small particle size side, measured in μm, and $D_v$1 (after compression) is a particle size at which cumulative distribution by volume of the ternary precursor after compression reaches 1% as counted from the small particle size side, measured in μm.

7. The ternary precursor according to claim 1, wherein the ternary precursor is doped with element M, the element M is one or more of Zr, W, Al, Sr, Ti, Ca, Sb, Mg, Zn, Te, and Fe.

8. A preparation method of ternary precursor, comprising:

providing a first mixed nickel-cobalt-manganese metal salt solution and a second mixed nickel-cobalt-manganese metal salt solution;

adding a first base solution having a first pH value and a first ammonia concentration to a first reactor, and adding the first mixed nickel-cobalt-manganese metal salt solution, an alkali solution, and ammonia to the first reactor to maintain the pH value and the ammonia concentration unchanged, so as to form a seed crystal slurry of ternary precursor; and adding water as a base solution to a second reactor, adding the seed crystal slurry of ternary precursor to adjust the base solution to a second pH value and a second ammonia concentration, and adding the second mixed nickel-cobalt-manganese metal salt solution, an alkali solution, ammonia, and the seed crystal slurry of ternary precursor to the second reactor to maintain the pH value and the ammonia concentration unchanged, so as to form a ternary precursor;

wherein primary particles or whiskers of the ternary precursor are distributed in a radial direction; and a deformation stacking fault probability $f_D$ of the ternary precursor is ≤2.5%, and the deformation stacking fault probability $f_D$ is calculated as follows:

$$f_D=0.1552\times B\ (101)-0.03233\times B\ (102)-0.4399/D\ (001),$$

where B (101) is a full width at half maximum in an X-ray diffraction pattern of a (101) crystal plane of the ternary precursor, B (102) is a full width at half maximum in an X-ray diffraction pattern of a (102) crystal plane of the ternary precursor, and D (001) is a full width at half maximum in an X-ray diffraction pattern of a (001) crystal plane of the ternary precursor, where the full widths at half maximum are measured in degrees;

wherein the ternary precursor comprises an inner core and a shell enclosing the inner core, a radius R of the inner core is 0.1-6.0 μm, and a thickness h of the shell is 2-10 μm;

wherein a molar ratio of nickel, cobalt, and manganese in the first mixed nickel-cobalt-manganese metal salt solution is x: y: (1-x-y), wherein 0.8≤x<1.0, 0<y<0.2, and x+y<1; and a molar ratio of nickel, cobalt, and manganese in the second mixed nickel-cobalt-manganese metal salt solution is a: b: (1-a-b), wherein 0.8≤a<1.0, 0<b<0.2, a+b<1, and a≤x.

9. The method according to claim 8, wherein the first pH value is 11.5-12.5; and the first ammonia concentration is 0.2-0.6 mol/L.

10. The method according to claim 8, wherein the second pH value is 11.0-12.0; and the second ammonia concentration is 0.2-0.6 mol/L.

11. The method according to claim 8, wherein a solid-liquid ratio of the seed crystal slurry of ternary precursor in the second reactor is 0.1-0.2.

12. The method according to according to claim 8, wherein a volume-based median particle size $D_v$50 of the seed crystal slurry of ternary precursor is 1-5 μm; and a volume-based median particle size $D_v$50 of the ternary precursor is 5-15 μm.

13. A ternary positive electrode material, made of the ternary precursor according to claim 1.

14. The ternary positive electrode material according to claim 13, wherein the ternary positive electrode material comprises secondary particles formed by aggregation of a plurality of primary particles, wherein the plurality of primary particles are arranged in a radial direction of the secondary particles.

15. The ternary positive electrode material according to claim 13, wherein a volume-based median particle size $D_v$50 of the ternary positive electrode material is 5-15 μm.

16. A secondary battery, comprising the ternary positive electrode material according to claim 13.

17. A battery module, comprising the secondary battery according to claim 16.

18. The ternary precursor according to according to claim 1, wherein said X-ray diffraction patterns are measured with a Brucker D8DISCOER X-ray diffractometer performing a slow (1°/min) scan as a 2θ angle of 10-70°.

* * * * *